Feb. 21, 1961  E. M. GULTON ET AL  2,972,180
ELECTRICAL COMPONENTS AND METHOD OF MAKING SAME
Filed Jan. 11, 1956
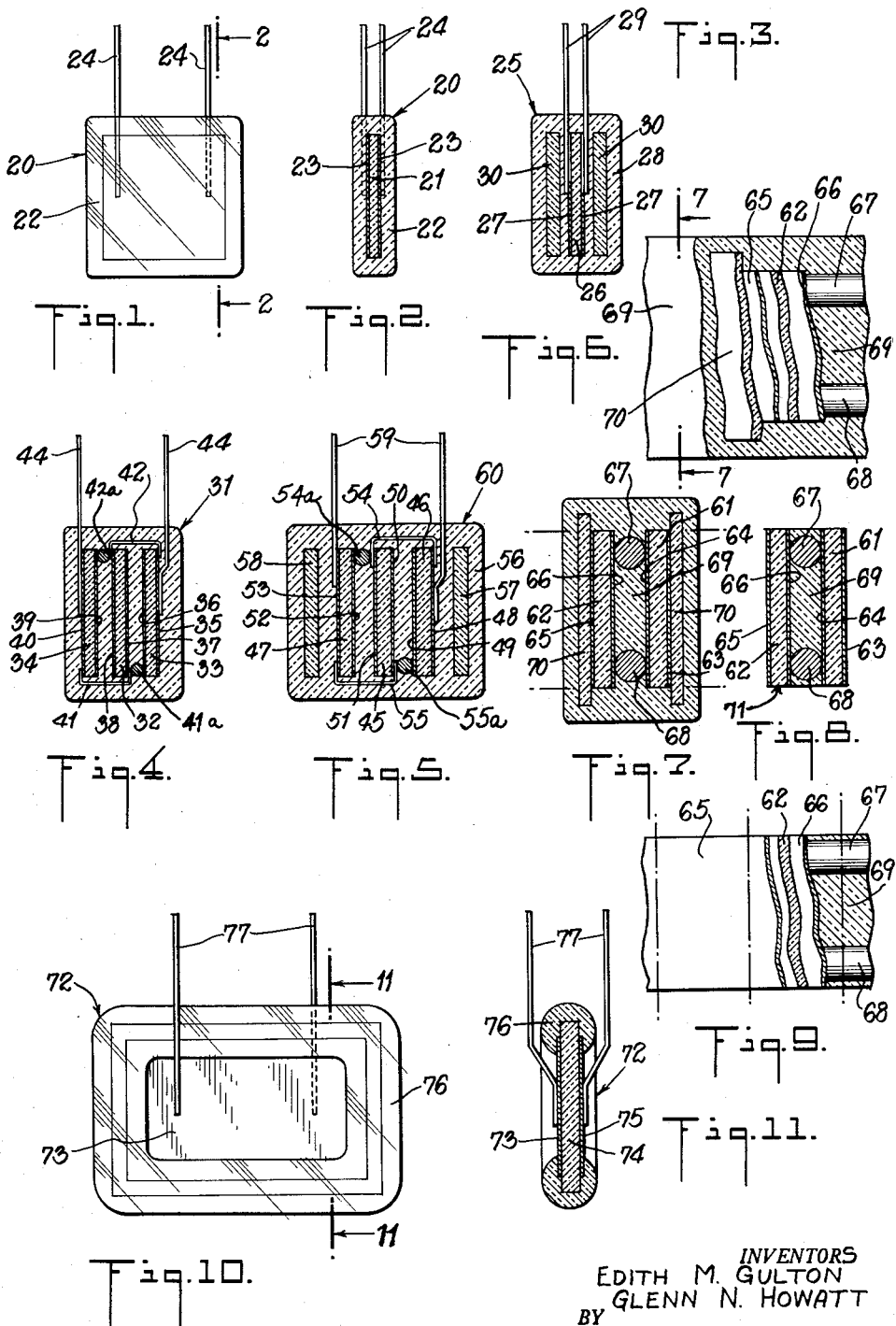
INVENTORS
EDITH M. GULTON
GLENN N. HOWATT
BY
Cyrus D. Samuelson
ATTORNEY

United States Patent Office 2,972,180
Patented Feb. 21, 1961

2,972,180

ELECTRICAL COMPONENTS AND METHOD OF MAKING SAME

Edith M. Gulton and Glenn N. Howatt, Metuchen, N.J., assignors to Gulton Industries, Inc., Metuchen, N.J., a corporation of New Jersey Filed Jan. 11, 1956, Ser. No. 558,550

2 Claims. (Cl. 29—25.42)

Our invention relates to ceramic electrical components and in particular to those which utilize durable moisture-proof coatings which do not deteriorate at high temperatures.

Up to now, the miniaturization and sub-miniaturization programs, which have been brought about by the demand for placing more and more electronic equipment in smaller and smaller space, have utilized ceramic electrical components. In particular, high capacity ceramic capacitors have, because of the high dielectric constant of the ceramics employed, been produced in very small sizes. Most of these ceramic capacitors have been coated with plastics and similar materials which are not durable, moisture-impervious or free of deterioration at high temperatures. As the electronic equipment gets smaller and smaller, the temperatures within the equipment gets progressively higher, thereby increasing the frequency of deterioration of the capacitor coatings. This coating deterioration generally manifests itself in the common running or flowing of portions of the outer covering of the capacitors. Coating deterioration also results in charring of the component after degradation of the coating. We have produced capacitors which do not possess the afore-mentioned disadvantages and which may be produced economically by mass production techniques.

Our invention may also be employed to produce piezoelectric ceramic bender elements. Presently, these bender elements are constructed in the so-called "sandwich" form. This "sandwich" consists, essentially, of two thin strips of ceramic between which is placed a thin strip of metal. The metal strip serves to connect the inner metallic electrodes of strips of ceramic. The two ceramic strips may be artificially polarized in the same direction or in opposite directions in accordance with the teachings of Patents 2,640,165 and 2,633,543 of Glenn N. Howatt.

In the production of the presently known bender elements it is necessary to solder the metal center strip to each of the outer ceramic elements after the ceramic has been fired and formed and electrodes have been applied to the surfaces. Our invention teaches the use of glass in place of the solder used in prior art devices. Since glass is an insulator, a metallic jumper or conductive ceramic silver is employed to make the electrical connection between the inner electrodes. The glass chosen matches the expansion and compliance of the ceramic, thereby permitting higher outputs to be attained.

Our invention may be employed to produce "sandwich" ceramic bender elements with or without a metallic center strip.

Ceramic thermistors, resistors with negative temperature coefficients, may also be produced by the methods of our invention.

Accordingly, it is a principal object of our invention to provide ceramic electrical components which are moisture-impervious and durable and whose coatings do not deteriorate at elevated temperatures.

It is a further object of our invention to provide ceramic capacitors which are moisture-impervious and durable and whose coatings do not deteriorate at elevated temperatures.

It is a still further object of our invention to provide ceramic benders which are crack and breakage resistant and which possess a high electrical output.

It is a still further object of our invention to provide ceramic thermistors which are moisture-impervious, durable and crack and breakage resistant.

It is a still further object of our invention to provide a method for producing these ceramic electrical components.

Other objects and advantages of our invention will be apparent during the course of the following description.

The technique of our invention employs glass as the bonding or coating medium. A glass suspension is placed on the electroded ceramic element by dipping, squeegeeing or spraying so as to cover the edges of the ceramic-silver joint. After firing the completed unit, it may be assembled by typical soldering techniques.

A second alternative method is to use thin sheets of glass which may be pressed, extruded, made by thin sheet methods or made by typical glass working techniques. One side of the sized glass sheet may be dipped in ceramic silver to act as the conductive jumper. The electroded ceramic is sandwiched between these thin glass sheets so that the ceramic electrode makes contact to the jumper around the glass. After firing, which action bonds the combination together, leads may be attached to the silver on the glass by standard soldering techniques, thereby making contact to the ceramic electrodes.

A third alternative method is to attach silver or other non-corroding wire to the electroded ceramic with a silver-glass mixture and fire so as to sinter the combination, which action permanently connects the leads to the ceramic. Glass powder is then sprayed or painted on the combination or the combination is dipped in the glass powder so as to enclose the ceramic plate or sandwiches of plates. The unit is then fired to the maturity of the glass.

A fourth alternative method is to attach the silver or non-corroding wire to the electroded ceramic, as in the third alternative method, and to pass the combination through a pre-heating cycle during which it is brought up to the temperature of molten glass. The combination is then dipped in molten glass so that all the ceramic and a portion of the wires, completely external to the ceramic, are covered with glass. The combination is then withdrawn to an annealing chamber and more or less slowly cooled. The pre-heating and cooling cycles are used to prevent cracking of the ceramic or glass.

In the production of benders, the outer surfaces may be masked by ceramic or other plates. The plates to be joined are separated by non-tarnishing wires of appropriate thickness. These wires make electrical contact between the plates and hold the plates the proper distance apart. The glass is thereby permitted to flow between the plates, bonding them and the wires into a single integral unit. The masking sheets are then removed, where desired, thereby exposing the bare electrodes.

In all cases, the coefficient of thermal expansion of the glass should match that of the ceramic. If the coefficients of thermal expansion do not match, there is considerable likelihood that the component will crack, fracture or shatter due to the unequal expansion and contraction of the ceramic and glass due to changes in temperature.

In the accompanying drawings, forming a part of this application, and in which like numerals are employed to designate like parts throughout the same, Figure 1 is a front elevational view of a single plate electrical component, constituting an embodiment of our invention, Figure 2 is a cross-sectional view along the line 2—2 of Figure 1, Figure 3 is a cross-sectional view of a single plate electrical component wherein outer ceramic plates are utilized for increased stability, constituting a further embodiment of our invention, Figure 4 is a cross-sectional view of a multi-plate electrical component, constituting a still further embodiment of our invention, Figure 5 is a cross-sectional view of a multi-plate electrical component wherein outer ceramic plates are utilized for increased stability, constituting a still further embodiment of our invention, Figure 6 is a plan view, partly broken away, of a twin plate electrical component wherein conductors are utilized both to make the inner electrical connection between the plates and to maintain proper spacing between the plates and larger outer ceramic plates are utilized to mask the electrodes, illustrating a production step of a still further embodiment of our invention, Figure 7 is a cross-sectional view along the line 7—7 of Figure 6, Figure 8 is a cross-sectional view of the finished component whose earlier production step is illustrated in Figure 6, Figure 9 is a plan view, partly broken away, of the finished component of Figure 8, the dashed lines illustrating the locations of cutting lines whereby several components are fashioned from a larger element, Figure 10 is a front elevational view of a single plate electrical component wherein portions of the electrode surfaces are bare and the outer periphery of the component is sealed with glass, constituting a further embodiment of our invention, and Figure 11 is a cross-sectional view along the line 11—11 of Figure 10.

In the drawings, wherein for the purpose of illustration, are shown preferred embodiments of our invention, the numeral 20 designates an electrical component, generally, comprising ceramic plate 21 with electrodes 23, glass coating 22 and electrical leads 24. Electrical component 25 comprises ceramic plate 26 with electrodes 27, outer ceramic plates 30, leads 29 and glass coating 28.

Electrical component 31 comprises ceramic plate 32 with electrodes 37 and 38, ceramic plate 33 with electrodes 35 and 36, ceramic plate 34 with electrodes 39 and 40, electrical jumpers 41, 41a, 42 and 42a, glass coating 43 and leads 44.

Electrical component 60 comprises ceramic plate 45 with electrodes 50 and 51, ceramic plate 46 with electrodes 48 and 49, ceramic plate 47 with electrodes 52 and 53, electrical jumpers 54, 54a, 55 and 55a, glass coating 56, outer ceramic plates 57 and 58 and leads 59.

Electrical component 71 comprises ceramic plates 61 and 62 with electrodes 63 and 64 and 65 and 66 respectively, conductive spacers 67 and 68, and glass 69. Ceramic plates 70 are utilized during production to mask electrodes 63 and 65.

Electrical component 72 comprises ceramic plate 74 with electrodes 73 and 75, glass coating 76 and leads 77.

Electrical component 20 of our invention is produced by the following preferred method. The ceramic dielectric 21 is formed by the usual ceramic thin sheet techniques and electrodes 23 are applied to 21 by firing, reduction, spraying or any other suitable technique. Then leads 24 are tacked, squeegeed or similarly set in place on electrodes 23 so that leads 24 will remain affixed during the processing. The combination is fired so that the leads 24 are now soldered to electrodes 23. The resulting combination, except for the portions of leads 24 which are external to the body of 20, is dipped in or sprayed with glass powder. Finally, the combination, supported by leads 24, is passed through a firing cycle so as to fire 20 until glass 22 matures.

Alternatively, the above procedure may be altered after the leads 24 have been affixed to electrodes 23 and the first firing cycle completed, as follows: the combination is slowly preheated until it reaches the temperature of molten glass; it is then placed in a bath of molten glass so that glass 22 completely covers ceramic 21 and electrodes 23 and a short portion of leads 24 external to 21. The unit is then withdrawn to an annealing chamber and slowly cooled.

Electrical component 25 is formed by either of the methods described for 20. Outer ceramic plates 30 are placed in position after leads 29 are suitably applied to electrodes 27 as described above and the combination is fired. The resulting combination is dipped in glass powder or is sprayed with glass powder. Finally, the combination, supported by leads 29, is passed through a firing cycle so as to fire 25 until glass 28 matures.

Alternatively, the above procedure may be altered as follows: after leads 29 have been affixed to electrodes 27, outer ceramic plates 30 have been placed in position and the combination has been through the first firing cycle so as to solder leads 29 to electrodes 27 and to fire plates 30 as a part of the combination, the combination is slowly preheated until it reaches the temperature of molten glass; it is then placed in a bath of molten glass so that glass 28 completely covers ceramic plates 26 and 30, electrodes 27 and a short portion of leads 29 external to 26. The unit is then withdrawn to an annealing chamber and slowly cooled.

Electrical component 31 is produced by the following preferred method. Ceramic plates 32, 33 and 34 are electroded by any of the standard techniques. Jumper 41 is tacked, squeegeed or similarly set in place on electrodes 37 and 40 and jumper 41a is suitably attached between electrodes 37 and 36. Jumpers 42 and 42a are similarly affixed to electrodes 35 and 38 and between electrodes 38 and 39, respectively. Leads 44 are applied as described for the production of 20 and the combination is fired. This action permanent solders leads 44 to electrodes 35 and 40, jumper 41 to electrodes 37 and 40, jumper 41a to electrodes 36 and 37, jumper 42 to electrodes 35 and 38 and jumper 42a to electrodes 38 and 39. The combination, except for the portions of leads 44 external to the body of 31, is now dipped in or sprayed with glass powder and, supported by leads 44, is passed through a firing cycle until glass 43 matures.

Alternatively, electrical component 31 may also be produced by the following method. Ceramic plates 32, 33 and 34 are electroded by any of the standard techniques. Thin glass sheets are prepared by being pressed, extruded, made by thin sheet techniques, or made by typical glass working techniques. The glass sheets are made the same length and width as 32, 33 and 34 and dipped in ceramic silver. The conductive glass sheets are then placed between 32 and 33 and 32 and 34 so that contact is made to electrodes 36, 37, 38 and 39. Jumper 41 is tacked, squeegeed or similarly set in place on electrodes 37 and 40 and jumper 42 is similarly attached to electrodes 38 and 35. Leads 44 are applied as described for the production of 20 and the combination is fired. This action permanently solders leads 44 to electrodes 35 and 40, solders jumper 41 to electrodes 37 and 40 and solders jumper 42 to electrodes 35 and 38. The same process causes the conductively coated glass plates, which have been placed between 32 and 33 and 32 and 34, to sinter and form conductive paths between 36 and 37 and 38 and 39. The combination, except for the portions of leads 44 external to the body of 31, is now dipped in or sprayed with glass powder and supported by leads 44 is passed through a firing cycle until glass 43 matures.

The production of electrical component 60 is accomplished by combining either of the operations employed for the manufacture of 44 with those used in the manufacture of 25. The complete unit is equivalent to 44 with the addition of the outer ceramic elements 57 and 58 which correspond to elements 39 of Figure 3.

Electrical component 71 is produced by the following preferred method. Leads 67 and 68 are placed between ceramic plates 61 and 62 so that each of them are in contact with electrodes 64 and 66. 67 and 68 also serve to keep 61 and 62 equidistant from each other. The combination is fired, thereby soldering 67 and 68 to 64 and 66. Ceramic plates 70 which are wider than 61 and 62 are placed in contact with 63 and 65 and tacked in place. Then glass powder is sprayed on the combination or the combination is dipped in glass powder. The complete unit is fired to the maturity of glass 69. Then glass 69 is cut along the dotted lines of Figure 7 and ceramic plates 70 are removed, leaving the units illustrated in Figures 8 and 9. Individual components such as piezoelectric benders are fabricated by cutting along the dotted lines of Figure 9. 67 or 68 serves as the external contact to electrodes 64 and 66 and external connection to electrodes 63 and 65 may be made in the usual manner, permitting component 71 to be polarized by standard techniques and then to be utilized as a piezoelectric ceramic bender.

Alternatively, after the completion of the first firing cycle and the placing of ceramic plates 70, the combination is slowly preheated until it reaches the temperature of molten glass; it is then placed in a bath of molten glass so that glass 69 completely covers plates 70. The combination is then withdrawn to an annealing chamber and slowly cooled. Then the same procedure for removing plates 70 and cutting 71 to size is followed as described above.

Electrical component 72 is produced in the following manner. Ceramic plate 74 has electrodes 73 and 75 applied to it in the usual manner. Glass powder is applied by suitable methods so that it completely covers the joints between 73 and 74 and 74 and 75, leaving a portion of 73 and 74 bare. The combination is then fired to the maturity of glass 76. Leads 77 are applied to the bare portions of 73 and 74 by standard soldering techniques.

Alternatively, component 72 may be heated to the temperature of molten glass and supported at the center of the electrode surfaces and rotated so that each edge may be dipped in molten glass. The combination is then withdrawn to an annealing chamber and slowly cooled.

Electrical components produced according to our invention may be utilized as capacitors, piezoelectric ceramic elements or ceramic thermistors with equal utility. The polarizable titanates such as barium titanate and various compounds of other metallic titanates in conjunction with barium titanate as well as other ceramics have been found to be adaptable to the methods and teachings of our invention. Piezoelectric bender elements, produced in accordance with our invention and polarized by standard methods, have been found to be very stable in operation and mechanically rugged.

While we have described our invention by means of specific examples and in specific embodiments, we do not wish to be limited thereto, for obvious modifications will occur to those skilled in the art without departing from the spirit of our invention or the scope of the subjoined claims.

Having thus described our invention, we claim:

1. The method of producing ceramic electrical components comprising applying electrodes to a ceramic dielectric body, attaching leads to said electrodes, heating the combination to the temperature of molten glass, placing the combination in molten glass such that it is completely enclosed by said molten glass except for said leads, removing said capacitor from said molten glass, cooling the combination, placing ceramic sheets external to said combination, refiring the new combination and cooling the same.

2. The method of producing ceramic electrical components comprising: placing electrodes on the surfaces of two ceramic bodies; placing a pair of conductors between said ceramic bodies and in contact with one electrode of each said ceramic body; placing a second pair of ceramic bodies, larger than said first pair of ceramic bodies in contact with the external electrodes of said bodies; heating the combination to the temperature of molten glass; immersing said combination in molten glass; removing to an annealing chamber and slowly cooling said combination; removing said external ceramic bodies and cutting said components to the desired size.

References Cited in the file of this patent

UNITED STATES PATENTS

| | | |
|---|---|---|
| 2,398,176 | Deyrup | Apr. 9, 1946 |
| 2,531,389 | Brandt | Nov. 28, 1950 |
| 2,619,519 | Marks | Nov. 25, 1952 |
| 2,696,577 | Smith | Dec. 7, 1954 |

FOREIGN PATENTS

| | | |
|---|---|---|
| 592,316 | Great Britain | Sept. 15, 1947 |